United States Patent
Yoshimoto et al.

(10) Patent No.: US 6,814,195 B2
(45) Date of Patent: Nov. 9, 2004

(54) LOCKUP CLUTCH FOR TORQUE CONVERTER

(75) Inventors: Tokuji Yoshimoto, Hamamatsu (JP); Koji Inoue, Hamamatsu (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 0 days.

(21) Appl. No.: 10/309,155

(22) Filed: Dec. 4, 2002

(65) Prior Publication Data

US 2003/0079951 A1 May 1, 2003

Related U.S. Application Data

(62) Division of application No. 09/702,819, filed on Nov. 1, 2000, now Pat. No. 6,508,345.

(30) Foreign Application Priority Data

Nov. 11, 1999 (JP) ............................................. 11-320907

(51) Int. Cl.[7] ............................ F16H 41/24; F16H 45/02
(52) U.S. Cl. ..................................... 192/3.3; 192/105 R
(58) Field of Search ................................ 192/3.25, 3.29, 192/105 R, 105 F, 85 AA, 3.31, 3.3

(56) References Cited

U.S. PATENT DOCUMENTS

| | | | |
|---|---|---|---|
| 3,180,095 A | | 4/1965 | Schneider |
| 3,977,502 A | * | 8/1976 | Chana ........................ 192/3.3 |
| 4,033,436 A | | 7/1977 | Hoetger et al. |
| 4,044,556 A | | 8/1977 | Kuramochi et al. |
| 4,108,289 A | | 8/1978 | Arai et al. |
| 4,431,094 A | * | 2/1984 | Parthuisot et al. ........... 192/3.3 |
| 4,693,348 A | * | 9/1987 | Tsukamoto et al. ........ 192/3.29 |
| 4,924,978 A | | 5/1990 | Ohkubo |
| 5,174,423 A | * | 12/1992 | Tsukamoto et al. ........ 192/3.29 |
| 5,310,033 A | * | 5/1994 | Shibayama ................. 192/3.29 |
| 5,779,012 A | | 7/1998 | Middelmann et al. |
| 6,059,082 A | | 5/2000 | Fitzpatrick-Ellis et al. |
| 6,244,401 B1 | | 6/2001 | Malenschein et al. |

FOREIGN PATENT DOCUMENTS

JP 60-18659 1/1985

* cited by examiner

*Primary Examiner*—Saul Rodriguez
(74) *Attorney, Agent, or Firm*—Arent Fox PLLC

(57) ABSTRACT

A lockup clutch for a torque converter includes a pump extension, a receiving plate connected to the pump extension defining a hydraulic pressure chamber communicating with a portion between a pump impeller and a turbine impeller, a pressing plate opposed to the receiving plate for movement toward and away from the receiving plate, an annular friction clutch plate interposed between the receiving plate and the pressing plate and connected to the turbine impeller, a return spring for biasing the pressing plate in a retracting direction, and an escape bore permitting the inside and outside of the receiving plate to communicate with each other on the side of an inner periphery of the friction clutch plate. When the rotational speed of the pump impeller is increased to a value equal to or higher than a predetermined value, the pressing plate clamps the friction clutch plate in cooperation with the receiving plate under the action of a centrifugal hydraulic pressure within the hydraulic pressure chamber. Thus, the lockup clutch needs no special control but has a simple structure.

5 Claims, 3 Drawing Sheets

LOCKUP CLUTCH FOR TORQUE CONVERTER

This is a Division of application Ser. No. 09/702,819 filed Nov. 1, 2000 now U.S. Pat. No. 6,508,345. The disclosure of the prior application(s) is hereby incorporated by reference herein in its entirety.

BACKGROUND OF THE INVENTION

1. Field of the Invention

The present invention relates to a lockup clutch for a torque converter, which is designed to connect a pump impeller and a turbine impeller of the torque converter directly to each other.

2. Description of the Related Art

It is conventionally and widely conducted in a torque converter that when the torque converter is brought into an operation state in which its amplifying function has almost been eliminated, a lockup clutch is automatically brought into a turned-on state to mechanically connect a pump impeller and a turbine impeller directly to each other, so that the loss by the sliding of the impellers relative to each other is eliminated. As a lockup clutch designed to be automatically turned on, a centrifugal weight-type lockup clutch is conventionally known, wherein a centrifugal weight is mounted to a driving plate connected to a pump impeller, so that when the rotational speed of the pump impeller is equal to or higher than a predetermined value, frictional engage portions of the lockup clutch are brought into engagement with one another by the centrifugal force of the centrifugal weight (for example, see Japanese Patent Application Laid-open No.60-18659).

The lockup clutch of the centrifugal weight type does not require a special control for operating the lockup clutch, but suffers from a disadvantage that its mechanical construction is complicated, resulting in an increase in cost.

SUMMARY OF THE INVENTION

Accordingly, it is an object of the present invention to provide a lockup clutch of the above-described type for a torque converter, which does not require a special control and moreover, is of a simple construction.

To achieve the above object, according a first aspect and feature of to the present invention, there is provided a lockup clutch for a torque converter, for connecting a pump impeller and a turbine impeller of the torque converter directly to each other, the lockup clutch comprising a pump extension connected to the pump impeller and surrounding the turbine impeller, a receiving plate connected to the pump extension to define, within the pump extension, a hydraulic pressure chamber communicating with an oil chamber defined between the pump impeller and the turbine impeller, a pressing plate opposed to the receiving plate for movement toward and away from the receiving plate, an annular friction clutch plate which is interposed between the receiving plate and the pressing plate and connected to the turbine impeller, a return spring for biasing the pressing plate in a direction away from the receiving plate, and an escape bore permitting the inside and outside of the receiving plate to communicate with each other on the side of an inner periphery of the friction clutch plate, wherein when the rotational speed of the pump impeller is increased to a value equal to or higher than a predetermined value, the pressing plate clamps the friction clutch plate in cooperation with the receiving plate under the action of a centrifugal hydraulic pressure which is raised within the hydraulic pressure chamber in response to the increase in the rotational speed.

With the above arrangement, when the oil of the torque converter is filled in the hydraulic pressure chamber in the lockup clutch, and the rotational speed of the pump impeller is increased to the value equal to or higher than the predetermined value, the pressing piston clamps the friction clutch plate in cooperation with the receiving plate under the action of the centrifugal hydraulic pressure of the oil to connect the clutch cylinder and the pump impeller to each other. Therefore, it is possible to construct the lockup clutch into a type depending on the pump rotational speed, which is of a simple construction, as compared with the type using a centrifugal weight and does not require a special control means. Moreover, the oil used in this lockup clutch is the oil for operating the torque converter and hence, an exclusive oil pump is not required, and it is possible to provide the lockup clutch at an inexpensive cost.

According to a second aspect and feature of the present invention, there is provided a lockup clutch for a torque converter, for connecting a pump impeller and a turbine impeller of the torque converter directly to each other, the lockup clutch comprising a clutch cylinder connected to the turbine impeller, a pressing piston slidably received in a cylinder bore in the clutch cylinder to define a hydraulic pressure chamber, a piston-return spring for biasing the pressing piston toward the hydraulic pressure chamber, a means for introducing an oil flowing out of the torque converter into the hydraulic pressure chamber, and a frictional engage means provided between the clutch cylinder and the pump impeller, wherein when the rotational speed of the turbine impeller is increased to a value equal to or higher than a predetermined value, the pressing piston operates the frictional engage means under the action of a centrifugal hydraulic pressure which is raised within the hydraulic pressure chamber in response to the increase in the rotational speed to connect the clutch cylinder and the pump impeller to each other.

The means for introducing the oil into the hydraulic pressure chamber corresponds to an inlet bore 92 in an embodiment of the present invention which will be described hereinafter, and the frictional engage means corresponds to driving and driven friction clutch plates 85 and 86 in an embodiment of the present invention which will be described hereinafter.

With the above arrangement, when the oil flowing out of the torque converter is filled in the hydraulic pressure chamber in the lockup clutch, and the rotational speed of the turbine impeller is increased to the value equal to or higher than the predetermined value, the pressing piston operates the friction engage means under the action of the centrifugal hydraulic pressure of the oil to connect the clutch cylinder and the pump impeller to each other. Therefore, it is possible to provide a lockup clutch of the type depending on the turbine rotational speed which is of a simple construction, as compared with the type using a centrifugal weight, and a special control means is not required. Moreover, the oil used in this case is also the oil for operating the torque converter and hence, an exclusive oil pump is not required.

According to a third aspect and feature of the present invention, in addition to the second feature, the clutch cylinder is provided with an escape bore which permits an outer periphery of the hydraulic pressure chamber to be open to the outside, and a centrifugal valve which is operable to open the escape bore when the rotational speed of the clutch cylinder is lower than a predetermined value, and to close the escape bore when the rotational speed of the clutch cylinder is equal to or higher than the predetermined value.

With the above arrangement, when the rotational speed of the clutch cylinder is lower than the predetermined value, the remaining pressure in the hydraulic pressure chamber is released quickly through the escape bore by opening of the centrifugal valve, thereby enhancing the turning-off performance of the lockup clutch, and even foreign matters such as cut powder within the hydraulic pressure chamber can be discharged along with the oil. On the other hand, when the rotational speed of the clutch cylinder is equal to or higher than the predetermined value, the hydraulic pressure in the hydraulic pressure chamber can be raised by closing the centrifugal valve, and the operation of the lockup clutch cannot be impeded.

The above and other objects, features and advantages of the invention will become apparent from the following description of the preferred embodiments taken in conjunction with the accompanying drawings.

DESCRIPTION OF THE PREFERRED EMBODIMENTS

The present invention will now be described by way of embodiments with reference to the accompanying drawings.

Figure 1:
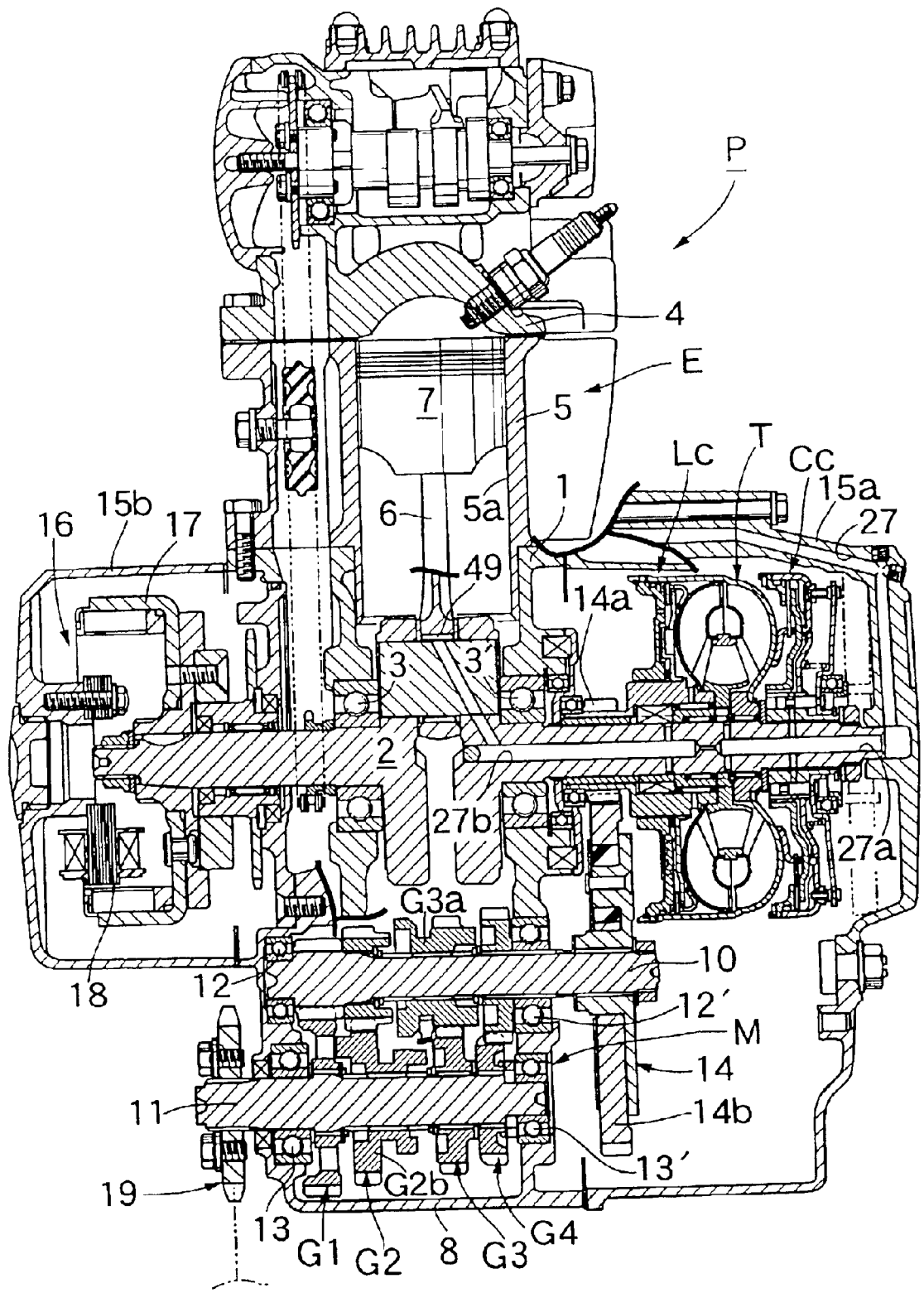
FIG. 1 is a perspective view of a vertical sectional view of a power unit for a motorcycle in a first embodiment of the present invention.

A first embodiment of the present invention will be first described with reference to FIGS. 1 and 2. Referring to FIG. 1, a power unit P for a motorcycle is comprised of an engine E and a multi-stage transmission M, which are provided integrally with each other. The engine E includes a crankshaft 2 carried in a crankcase 1 with a pair of left and right ball bearings 3 and 3' interposed therebetween, as conventionally usual, and a piston 7 slidably received in a cylinder bore 5a in a cylinder block 5 and connected to the crankshaft 2 through a connecting rod 6. The crankshaft 2 is disposed to face in a lateral direction of the motorcycle.

A transmission case 8 is integrally connected to the crankcase 1, and an input shaft 10 and an output shaft 11 of the multi-stage transmission M are disposed in parallel to the crankshaft 2 and carried on left and right opposite sidewalls of the transmission case 8 with ball bearings 12, 12'; 13, 13' interposed therebetween. A first-shift gear train G1, a second-shift gear train G2, a third-shift gear train G3 and a fourth-shift gear train G4 are disposed on the input shaft 10 and the output shaft 11 sequentially from a left side as viewed in FIG. 1. A driven gear G2b of the second-shift gear train G2 and a driving gear G3a of the third-shift gear train G3 serve as shifting gears, respectively. When both of the shifting gears G2b and G3a are in neutral positions, the transmission M is in a neutral state. When the shifting gear G2b is moved leftwards or rightwards as viewed in FIG. 1, the first-shift gear train G1 or the third-shift gear train G3 is established. When the shifting gear G3a is moved leftwards or rightwards, the second-shift gear train G2 or the fourth-shift gear train G4 is established. The shifting gears G2b and G3a are operated by a pedal-operated or manually operated changing device which is not shown.

A right end of the crankshaft 2 and a right end of the input shaft 10 of the transmission M are connected to each other with a shifting clutch Cc, a torque converter T and a primary reducing device 14 which are connected in series to one another outside the crankcase 1 and the transmission case 8. In this case, particularly, the shifting clutch Cc, the torque converter T and a driving gear 14a of the primary reducing device 14 are mounted on the crankshaft 2 in an order of the driving gear 14a, the torque converter T and the shifting clutch Cc from the side of the right sidewall of the crankcase 1 toward the outside. A right side cover 15a is coupled to right end surfaces of the crankcase 1 and the transmission case 8 to cover the driving gear 14a, the torque converter T and the shifting clutch Cc.

A rotor 17 of a generator 16 is secured to a left end of the crankshaft 2, and a stator 18 of the generator 16 is mounted to a left side cover 15b, which is coupled to a left end surface of the crankcase 1 to cover the generator 16.

A chain-type finally reducing device 19 for driving a rear wheel (not shown) of the motorcycle is connected to a left end of the output shaft 11 of the transmission M outside the transmission case 8.

Figure 2:
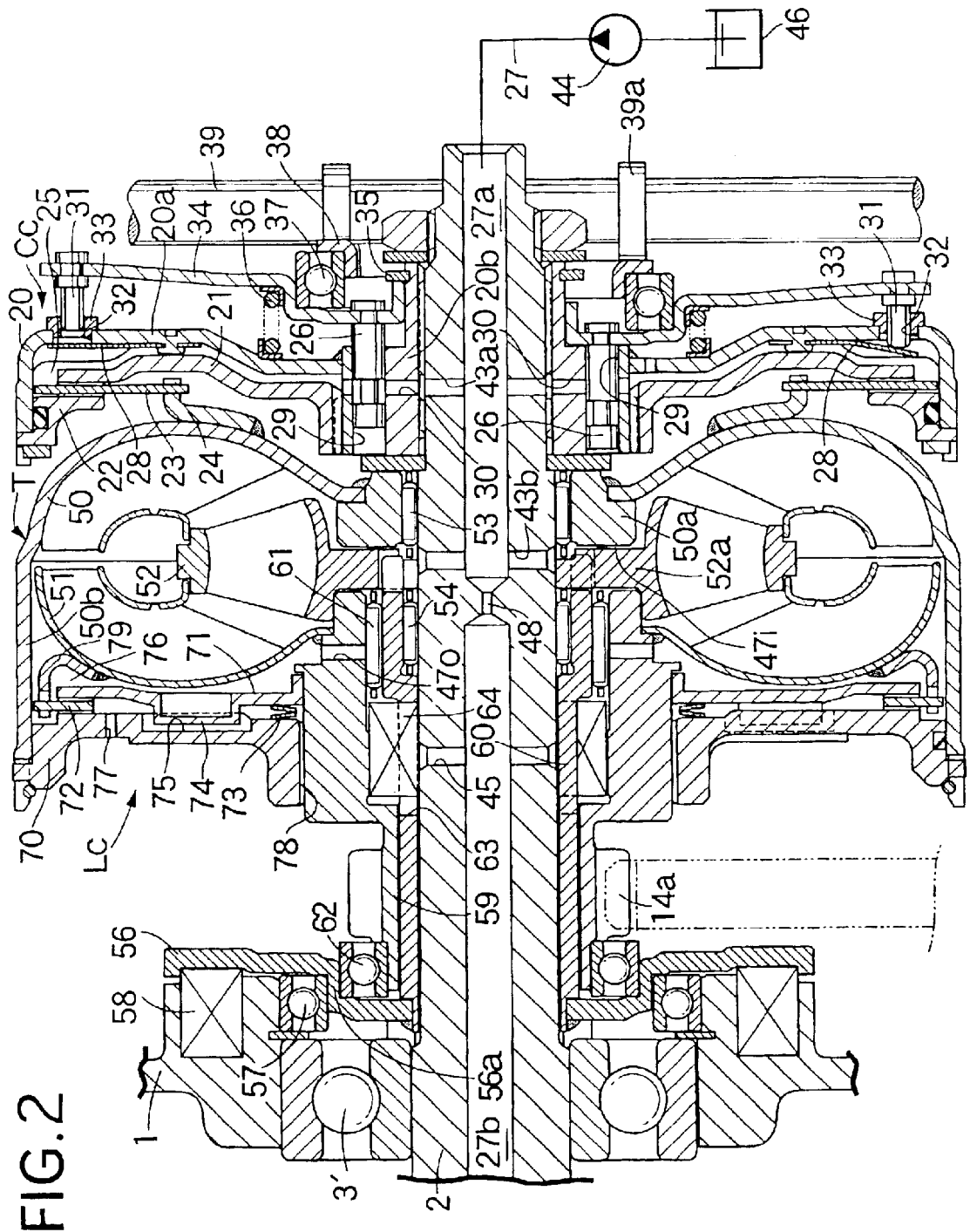
FIG. 2 is an enlarged vertical sectional view of a transmitting device in the power unit.

Referring to FIG. 2, the shifting clutch Cc includes a cylindrical clutch casing 20 which has an end wall 20a at one end and a boss 20b provided at its central portion and spline-coupled to the crankshaft 2, a pressing plate 21 disposed within the clutch casing 20 and slidably spline-coupled to an outer periphery of the boss 20b, a receiving plate 22 oil-tightly secured to an opened end of the clutch casing 20, and an annular friction clutch plate 23 interposed between the pressing plate 21 and receiving plate 22. A transmitting plate 24 of a pump impeller 50, which will be described hereinafter, is spline-engaged with an inner periphery of the friction clutch plate 23.

The pressing plate 21 defines a hydraulic pressure chamber 25 between the pressing plate 21 itself and an end wall 20a and a peripheral wall of the clutch casing 20. The hydraulic pressure chamber 25 is connected to a first inlet bore 43a in the crankshaft 2 through an inlet valve 26 mounted on the boss 20b of the clutch casing 20, and opened to the outside of the clutch casing 20 through an outlet valve 28 mounted on an outer peripheral portion of the end wall 20a.

The boss 20b is provided with a plurality of valve bores 29 extending in parallel to the crankshaft 2, and a plurality of through-bores 30 extending via each of the valve bores 29 and through the inlet bore 43a to the hydraulic pressure chamber 25. The inlet valve 26 comprising a spool valve is slidably received in each of the valve bores 29. When the inlet valves 26 assume rightward-moved positions as viewed in FIG. 2 (see the inlet valve 26 at an upper portion of FIG. 2), the through-bores 30 are opened. When the inlet valves 26 assume leftward-moved positions (see the inlet valve 26 at a lower portion of FIG. 2), the through-bores 30 are closed. To ensure the communication between the through-bores 30 in the boss 20b and the first inlet bore 43a in the crankshaft 2, it is effective to cut off a tooth or teeth at a portion of each of mutually-fitted spline sections of the crankshaft 2 and the boss 20b.

A plurality of outlet bores 32 are provided at circumferentially equal distances in the outer peripheral portion of the end wall 20a of the clutch casing 20, and an outlet valve 28 comprising a reed valve is caulked at one end to the end wall 20a for opening and closing the outlet bore 32 on the side of the hydraulic pressure chamber 25.

A guide collar 33 which is communicated with each of the outlet bores 32 is further secured to the end wall 20a, and a valve-opening bar 31 is slidably fitted into each of the guide collars 33. The valve opening bar 31 has, in its outer peripheral surface, an axial groove enabling an oil flow within the guide collar 33. When the valve-opening bar 31 assumes a rightward-moved position as viewed in FIG. 2 (see the valve-opening bar 31 at an upper portion of FIG. 2), the outlet valve 28 is permitted to close the outlet bore 32 by an own resilient force of the outlet valve 28. When the valve opening bar 31 assumes a leftward-moved position (see the valve-opening bar 31 at a lower portion of FIG. 2), the outlet valve 28 is flexed inwards of the hydraulic pressure chamber 25 to open the outlet bore 32.

A common valve-operating plate 34 is connected to outer ends of the inlet valve 26 and the valve opening bar 31. The valve-operating plate 34 is laterally slidably carried on the boss 20b of the clutch casing 20, and a stop ring 35 defining a rightward-moved position for the valve-operating plate 34 is locked on the boss 20b. A return spring 36 for biasing the valve-operating plate 34 toward the stop ring 35 is mounted under compression between the clutch casing 20 and the valve-operating plate 34.

An urging ring 38 is mounted on the valve-operating plate 34 with a release bearing 37 concentrically surrounding the boss 20b being interposed therebetween. An arm 39a fixedly provided on a shifting-clutch operating cam shaft 39 is engaged on an outer end surface of the urging ring 38, so that the valve-operating plate 34 can be moved laterally along with the inlet valve 26 and the valve-opening bar 31 in cooperation with the return spring 36 by reciprocally turning the shifting-clutch operating cam shaft 39.

An electric or electromagnetic clutch actuator (not shown) is connected to the shifting-clutch operating camshaft 39 for turning the shifting-clutch operating camshaft 39 during idling of the engine E or during shifting operation of the transmission M.

When the engine E is in a usual operated state, the valve-operating plate 34 is retained at a retracted position, i.e., a rightward-moved position as viewed in FIG. 2 (see the valve-operating plate 34 at the upper portion of FIG. 2) under the action of a biasing force of the return spring 36 to open the inlet valve 26 and to permit the closing of the outlet valve 28. Therefore, an oil pumped from an oil pump 44 is supplied from an upstream supply oil passage 27a via the first inlet bore 43a and the through-bore 30 into the hydraulic pressure chamber 25 in the clutch casing 20 to fill the chamber 25.

The clutch casing 20 is rotated along with the crankshaft 2 and hence, the oil in the hydraulic pressure chamber 25 in the clutch casing 20 receives a centrifugal force to generate a hydraulic pressure, and the pressing plate 21 urges the friction clutch plate 23 against the receiving plate 22 with such hydraulic pressure, whereby the pressing plate 21, the receiving plate 22 and the friction clutch plate 23 are brought into frictional engagement with one another. In other words, the shifting clutch Cc is brought into a turned-on state to transmit an output torque from the crankshaft 2 through the friction clutch plate 23 to the torque converter T.

On the other hand, during idling of the engine E or during shifting operation of the transmission M, the shifting-clutch operating cam 39 is turned by the clutch actuator to move the valve-operating plate 34 to the leftward-moved position as viewed in FIG. 2 (see the valve-operating plate 34 at the lower portion of FIG. 2), thereby closing the inlet valve 26 and opening the outlet valve 28. As a result, when the supplying of the oil from the upstream supply oil passage 27a to the hydraulic pressure chamber 25 is cut off, the oil in the hydraulic pressure chamber 25 is discharged through the outlet bore 32 to the outside of the clutch casing 20, whereby the hydraulic pressure in the hydraulic pressure chamber 25 is reduced, and the urging force of the pressing plate 21 to the friction clutch plate 23 is reduced remarkably. Therefore, the frictional engagement of the pressing plate 21, the receiving plate 22 and the friction clutch 23 with one another are released. In other words, the shifting clutch Cc is brought into a turned-off state and hence, the transmission of the torque from the crankshaft 2 to the torque converter T is cut off. The oil discharged to the outside of the clutch casing 20 is circulated to an oil reservoir 46.

When the rotation of the engine is accelerated for starting a vehicle, or the shifting operation is completed from the above state, the clutch actuator is immediately returned to a non-operated state, and the valve-operating plate 34 is retracted at a stretch to the rightward-moved position by the biasing force of the return spring 36 to open the inlet valve again and to close the outlet valve 28. Therefore, as can be seen from the above-described operation, the shifting clutch Cc is restored from the turned-off state to the turned-on state without passing through a clutch-slipping state. Namely, the shifting clutch Cc is of an on/off type having no clutch-slipping region and has a torque capacity which is set larger than that of the torque converter T.

Referring again to FIG. 2, the torque converter T is comprised of a pump impeller 50, a turbine impeller 51 and a stator impeller 52. The pump impeller 50 is disposed adjacent to the receiving plate 22 and has a boss 50a supported on the crankshaft 2 with a needle bearing 53 interposed therebetween. The transmitting plate 24 spline-engaged with the inner periphery of the friction clutch plate 23 is secured to an outer surface of the pump impeller 50. Therefore, a torque from the friction clutch plate 23 is transmitted through the transmitting plate 24 to the pump impeller 50.

A stator shaft 60 is disposed between the boss 50a of the pump impeller 50 and the ball bearing 3' supporting the crankshaft 2, and is supported at its right end on the crankshaft 2 with a needle baring 54 interposed therebetween. A boss 52a of the stator impeller 52 is connected to the stator shaft 60 by a recess-projection engagement. A stator arm plate 56 is secured to a left end of the stator shaft 60, and an outer peripheral surface of a cylindrical portion 56a provided at an intermediate portion of the stator arm plate 56 is supported on crankcase 1 with a ball bearing 57 interposed therebetween. An outer periphery of the stator arm plate 56 is supported on the crankcase 1 with a free wheel 58 interposed therebetween.

The turbine impeller 51 opposed to the pump impeller 50 has a turbine shaft 59 integrally provided at its center portion, and is supported at its right end on the stator shaft 60 with a needle bearing 61 interposed therebetween and at its left end on an inner peripheral surface of the cylindrical portion 56a of the stator arm plate 56 with a ball bearing 62 interposed therebetween. A one-way clutch 64 is mounted between the turbine shaft 59 and the crankshaft 2 to extend through a transverse bore 63 in the stator shaft 60. When a reverse load is applied to the turbine shaft 59, the one-way clutch 64 is turned on to connect the turbine shaft 59 and the crankshaft 2 directly to each other.

A clearance between the boss 50a of the pump impeller 50, the turbine shaft 59 and the boss 52a of the stator impeller 52 serves as a fluid inlet 47i in the torque converter T, and a fluid outlet 47o in the torque converter T is provided in that portion of the turbine shaft 59, which extends outwards of the turbine impeller 51. The fluid inlet 47i communicates with a second inlet bore 43b in the crankshaft 2, and the fluid outlet 47o communicates with an outlet bore 45 in the crankshaft 2. Therefore, when the oil supplied from the oil pump 44 to the upstream supply oil passage 27a in the crankshaft 2 enters the second inlet bore 43b, the oil flows through the fluid inlet 47i into an oil chamber defined between the pump impeller 50 and the turbine impeller 51 to fill such oil chamber and a hydraulic pressure chamber 76 in a lockup clutch Lc which will be described hereinafter, and then flows through the fluid outlet 47o via the outlet bore 45 into a downstream supply oil passage 27b in the crankshaft 2.

The driving gear 14a of the primary reducing device 14 is integrally formed on the turbine shaft 59, and the driven gear 14b meshed with the driving gear 14a is spline-coupled to the input shaft 10 of the transmission M. The primary reducing device 14 constructed in the above manner is disposed between the crankcase 1 and the torque converter T.

Thus, when the torque output from the crankshaft 2 is transmitted through the shifting clutch Cc in a turned-on state to the pump impeller 50, such torque is transmitted in a fluidic manner to the turbine impeller 51 under the action of the oil filling the torque converter T. At this time, if a torque amplifying effect is generated between both of the impellers 50 and 51, an attendant reaction force is burdened by the stator impeller 52, and the stator impeller 52 is fixedly supported on the crankcase 1 by a locking action of the free wheel 58. If the torque amplifying effect is not generated, the stator impeller 52 can be raced under the racing action of the free wheel 58. Therefore, the pump impeller 50, the turbine impeller 51 and the stator impeller 52 are rotated in the same direction.

The torque transmitted from the pump impeller 50 to the turbine impeller 51 is transmitted through the primary reducing device 14 to the input shaft 10 of the transmission M and then sequentially via the shifting gear trains G1 to G4 selectively established, the output shaft 11 and the final reducing device 19 to the rear wheel (not shown) to drive the rear wheel.

Upon application of an engine brake during traveling of the vehicle, the one-way clutch 64 is brought into a turned-on state by application of a reverse load torque to the turbine shaft 59. Therefore, the turbine shaft 59 and the crankshaft 2 are connected directly to each other, and the reverse load torque is transmitted to the crankshaft 2 without via the torque converter T, whereby a good engine brake effect can be provided.

A lockup clutch Lc is mounted between the pump impeller 50 and the turbine impeller 51 and capable of connecting the pump impeller 50 and the turbine impeller 51 directly to each other. The lockup clutch Lc includes a cylindrical pump extension 50b which is connected to the outer peripheral portion of the pump impeller 50 to surround the turbine impeller 51, a receiving plate 70 which is rotatably carried on the turbine shaft 59 and oil-tightly coupled to an opened end of the pump extension 50b, a pressing plate 71 which is slidably carried on the turbine shaft 59 and disposed in an opposed relation to an inner surface of the receiving plate 70, an annular friction clutch 72 interposed between the pressing plate 71 and the receiving plate 70, and a dished or Belleville return spring 73 interposed between the pump extension 50b and the pressing plate 71 for biasing the pressing plate 71 in a direction away from the receiving plate 70. An outer periphery of the friction clutch 72 is spline-engaged with the transmitting plate 79 secured to the outer surface of the turbine impeller 51. The receiving plate 70 and the pressing plate 71 are provided with dogs 74 and recesses 75, whose opposed surfaces are engaged with each other, so that the receiving plate 70 and the pressing plate 71 can slide axially relative to each other, while being rotated in unison with each other.

A hydraulic pressure chamber 76 is defined in the pump extension 50b by the receiving plate 70. The hydraulic pressure chamber 76 communicates with the insides of the pump impeller 50 and the turbine impeller 51 through opposed clearances in the pump impeller 50 and the turbine impeller 51, so that the oil is filled in the pump impeller 50 and the turbine impeller 51.

The receiving plate 70 is provided with an escape bore 77 permitting an inner periphery of the friction clutch plate 72 to be opened to the outside of the receiving plate 70, and an air vent groove 78 extending axially in an inner peripheral surface of the receiving plate 70.

Thus, when the rotational speed of the pump impeller 50 is lower than a predetermined value, the centrifugal force of the oil filling the hydraulic pressure chamber 76 in the pump extension 50b is small and hence, the hydraulic pressure in the hydraulic pressure chamber 76 is not raised, so that the pressing plate 71 is returned to the retracted position under the biasing force of the return spring 73 to release the friction clutch 72. Therefore, the lockup clutch Lc is in the turned-off state.

During this time, the oil in the hydraulic pressure chamber 76 flows from the escape bore 77 in the receiving plate 70 to the outside, but this does not impede the subsequent raising of the hydraulic pressure of the hydraulic pressure chamber 76, because the amount of oil escaped is extremely small.

When the rotational speed of the pump impeller 50 becomes equal to or higher than the predetermined value, the centrifugal force of the oil in the hydraulic pressure chamber 76 is correspondingly increased to raise the hydraulic pressure of the hydraulic pressure chamber 76. Therefore, the pressing plate 71 is advanced toward the receiving plate 70 by such raised hydraulic pressure, whereby the friction clutch plate 72 is clamped between the pressing plate 71 and the receiving plate 70, and as a result, the lockup clutch Lc is brought into the turned-on state. The lockup clutch Lc brought into the turned-on state connects the pump impeller 50 and the turbine impeller 51 directly to each other. Therefore, it is possible to eliminate the loss of the slipping of the impellers 50 and 51 relative to each other, thereby enhancing the transmitting efficiency.

In this case, the rising of the hydraulic pressure does not occur on the side of the inner periphery of the friction clutch plate 72 due to flowing of the oil from the escape bore 77. Therefore, a large difference in pressure is produced between opposite side surfaces of the pressing plate 71, whereby the clamping of the friction clutch 72 is achieved effectively.

Thus, the lockup clutch Lc can be constructed into a type depending on the rotational speed of the pump without use of a centrifugal weight by utilizing the centrifugal hydraulic pressure in the hydraulic pressure chamber 76 in the pump extension 50b connected to the pump impeller 50. Therefore, a special control means is not required and moreover, the oil used is a torque converter operating oil. Thus, an exclusive oil pump is not required, and it is possible to provide the lockup clutch Lc of the simple construction at an inexpensive cost.

During operation of the engine E, the oil discharged from the oil pump 44 first flows into the upstream supply oil passage 27a and via the first inlet bore 43a into the hydraulic pressure chamber 25 in the shifting clutch Cc to contribute to the operation and cooling of the hydraulic pressure chamber 25, and flows via the second inlet bore 43b into the oil chamber defined between the pump impeller 50 and the turbine impeller 51 and the hydraulic pressure chamber 76 in the lockup clutch Lc to contribute to the operation and cooling of the torque converter T and the lockup clutch Lc. Then, the oil passed from the hydraulic pressure chamber 76 through the outlet bore 45 to the downstream supply oil passage 27b is supplied to the needle bearing 49 provided around an outer periphery of a crank pin to contribute to the lubrication of the needle bearing 49. The oil, which has lubricated the needle bearing 49, is scattered to the surroundings with the rotation of the crankshaft 2 and put into the lubrication of the piston 7 and the like. The oil pump 44 originally serves to supply the lubricating oil to the engine E, but such oil is utilized as oil for operating the shifting clutch Cc, the torque converter T and the lockup clutch Lc. Therefore, it is unnecessary to provide an exclusive oil pump for supplying the operating oil, whereby the arrangement can be simplified.

The upstream supply oil passage 27a and the downstream supply oil passage 27b provided in the crankshaft 2 communicate directly with each other through an orifice 48, and hence, a portion of the oil fed from the oil pump 44 to the upstream supply oil passage 27a is passed through the orifice 48 directly to the downstream supply oil passage 27b without via the torque converter T and the like. Therefore, the proportion of oil dispensed to the torque converter T and the engine E can be determined as desired by the selection of the orifice 48.

A second embodiment of the present invention will be described with reference to FIG. 3.

The second embodiment is different from the previous first embodiment in respect of that a lockup clutch Lc' is constructed into an automatically controlled type depending on the rotational speed of the turbine impeller 51. More specifically, the lockup clutch Lc' is disposed outside a torque converter side cover 80, which is oil-tightly coupled to the pump extension 50b of the pump impeller 50 to cover the turbine impeller 51. The torque converter side cover 80 is rotatably carried around the outer periphery of the turbine shaft 59, and the inside of the torque converter side cover 80 communicates with the oil chamber defined between the pump impeller 50 and the turbine impeller 51, and the inside of the torque converter side cover 80 is filled with the operating oil, as is such oil chamber.

The lockup clutch Lc' is comprised of a flat clutch cylinder 81 spline-coupled to the left end of the turbine shaft 59 with its opened end turned toward the torque converter side cover 80, a pressing piston 82 slidably received in a cylinder bore 81a in the clutch cylinder 81 with a seal member 88 interposed therebetween, thereby defining a hydraulic pressure chamber 83 between the pressing piston 82 and an end wall of the clutch cylinder 81, a receiving ring 84 locked to an inner peripheral surface of the clutch cylinder 81 at a location closer to an opened end, a plurality of (two in the illustrated embodiment) annular driven friction clutch plates 86 slidably spline-engaged with the inner peripheral surface of the clutch cylinder 81 between the receiving ring 84 and the pressing piston 82, an annular driving friction clutch plate 85 having an inner peripheral surface axially slidably engaged with a plurality of transmitting claws 87, which are projectingly provided on an outer surface of the torque converter side cover 80, and a piston-return spring 89 disposed between the pressing piston 82 and the torque converter side cover 80 on the side of the inner peripheries of the driving and driven friction clutch plates 85 and 86 for biasing the pressing piston 82 toward the hydraulic pressure chamber 83. The clutch cylinder 81 and the pressing piston 82 are provided with dogs 90 and recesses 91 whose opposed surfaces are engaged with each other, so that clutch cylinder 81 and the pressing piston 82 can be slid axially relative to each other, while being rotated in unison with each other.

A fluid outlet 47o and an inlet bore 92 are provided in the turbine shaft 59 to permit the inside of the torque converter side cover 80 and the hydraulic pressure chamber 83 in the clutch cylinder 81 to communicate with the inner periphery of the turbine shaft 59. The inside of the torque converter side cover 80 and the hydraulic pressure chamber 83 in the clutch cylinder 81 are permitted to communicate with each other through the fluid outlet 47o, the inlet bore 92 and the inside of the turbine shaft 59.

A plurality of escape bores 93 are provided circumferentially at equal distances in a peripheral wall of the clutch cylinder 81, so that the hydraulic pressure chamber 83 opens to the outside of the clutch cylinder 81. An annular groove 94 is provided in the inner peripheral surface of the clutch cylinder 81 to permit the escape bores 93 to communicate with one another, and a centrifugal valve 95 is disposed in the annular groove 94 to close the escape bores 93 with a centrifugal force, when the rotational speed of the clutch cylinder 81 is equal to or higher than a predetermined value. The centrifugal valve 95 is formed of a free-ended ring made of a single resilient wire material, with at least one end engaged with one of the recesses 91 in the pressing piston 82, and rotated along with the pressing piston 82 and thus the clutch cylinder 81. The centrifugal valve 95, in its free state, is contracted radially to open the escape bores 93, but when the rotational speed of the clutch cylinder 81 is equal to or higher than the predetermined value, the centrifugal valve 95 is expanded radially by the centrifugal force to come into close contact with a bottom surface of the annular groove 94, thereby closing all of the escape bores 93.

Figure 3:
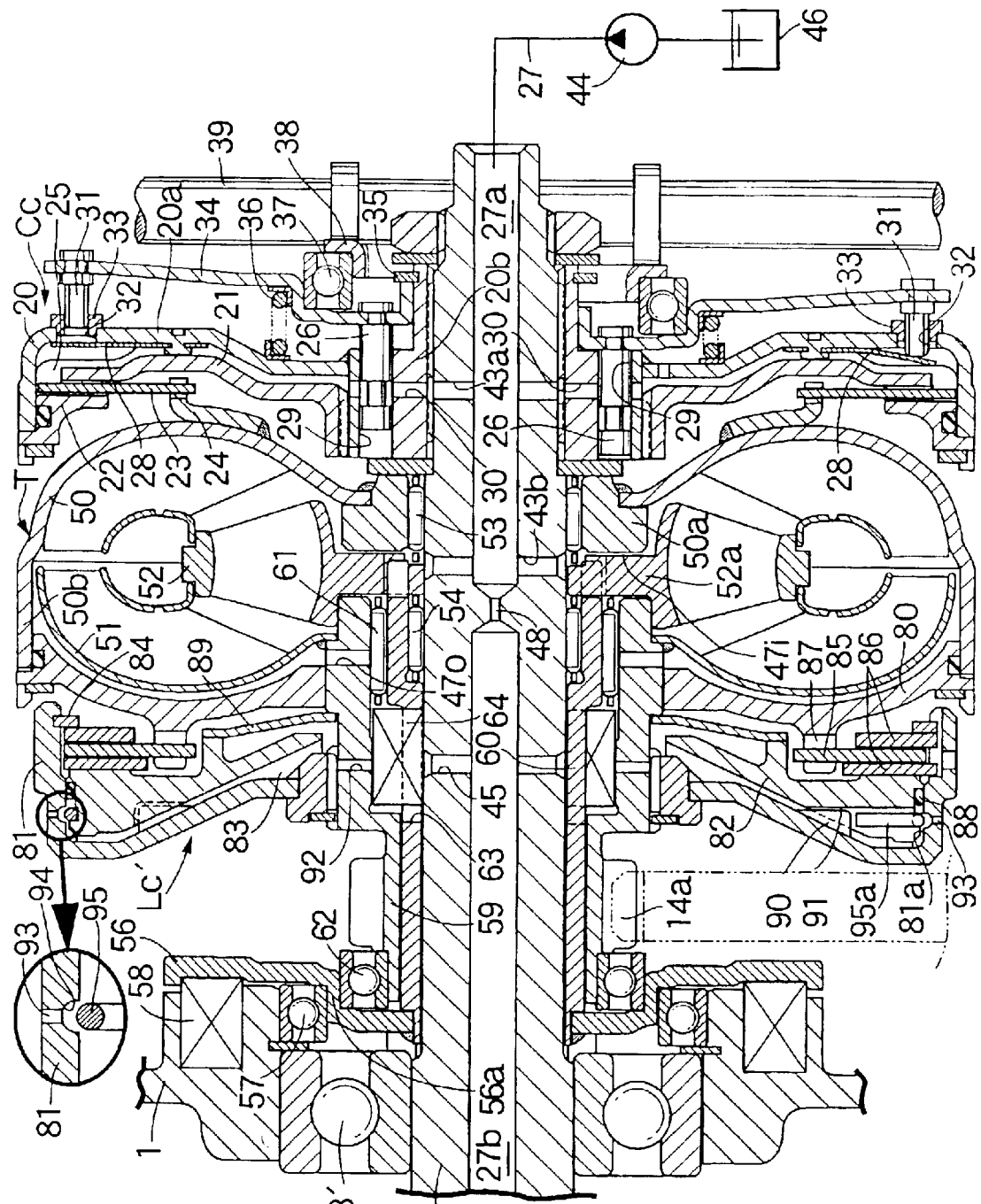
FIG. 3 is a sectional view similar to FIG. 2, but according to a second embodiment of the present invention.

The other arrangement is the same as that in the previous first embodiment and hence, portions or components corresponding to those in the first embodiment are designated by like reference characters in FIG. 3, and the description of them is omitted.

Thus, when the oil supplied from the oil pump 44 to the upstream supply oil passage 27a in the crankshaft 2 enters the second inlet bore 43b, such oil flows through the fluid inlet 47i into the oil chamber defined between the pump impeller 50 and the turbine impeller 41 to fill such oil chamber and the inside of the torque converter side cover 80, and then flows through the fluid outlet 47o into the turbine shaft 59. The oil fed into the turbine shaft 59 is diverted into two flows toward the inlet bore 92 and the outlet bore 45. The oil flowing to the inlet bore 92 flows into the hydraulic pressure chamber 83 in the lockup clutch Lc', while the oil flowing to the outlet bore 45 flows toward the downstream supply oil passage 27b in the crankshaft 2, as in the previous embodiment.

On the other hand, in the lockup clutch Lc', the clutch cylinder 81 is rotated along with the turbine impeller 51 through the turbine shaft 59. Therefore, if the rotational seed of the turbine impeller 51 is lower than a predetermined value, the centrifugal valve 95 maintains its contracted state against the centrifugal force to keep the escape bore 93 opened. Therefore, the oil flowing through the inlet bore 92 into the hydraulic pressure chamber 83 flows out of the clutch cylinder 81 through the escape bores 93 and hence, the hydraulic pressure in the hydraulic pressure chamber 83 is not raised. Thus, the pressing piston 82 is maintained at its retracted position under the action of the biasing force of the piston-return spring 89, so that the driving and driven friction clutch plates 85 and 86 are in their non-engaged states. In other words, the lockup clutch Lc' is in its turned-off state.

During this time, if foreign matters such as cut powder or friction powder are present in the hydraulic pressure chamber 83, the foreign matters can be discharged out of the clutch cylinder 81 through the escape bores 93 along with the oil.

When the rotational speed of the turbine shaft 59 is equal to or higher than the predetermined value, the centrifugal valve 95 rotated along with the turbine shaft 59 is expanded under the action of its own increased centrifugal force to close all of the escape bores 93. As a result, the hydraulic pressure chamber 83 is filled with the oil supplied through the inlet bore 92, and a hydraulic pressure is generated in the hydraulic pressure chamber 83 by the centrifugal force of the oil. The pressing piston 82 is advanced toward the receiving ring 84 by such centrifugal force to bring the driving and driven friction clutch plates 85 and 86 are in their frictionally engaged states, and in this manner, the lockup clutch Lc' is brought into the turned-on state. The lockup clutch Lc' brought into the turned-on state connects the pump impeller 50 and the turbine shaft 59 directly to each other and hence, the slipping of the pump impeller 50 and the turbine impeller 51 relative to each other can be eliminated to enhance the transmitting efficiency.

When the rotational speed of the turbine shaft 59 is reduced to lower than the predetermined value, the centrifugal valve 95 is opened again. Therefore, the remaining pressure in the hydraulic pressure chamber 83 can be released quickly through the escape bores 93 and hence, the turning-off performance of the lockup clutch Lc' can be enhanced.

Thus, the lockup clutch Lc' can be constructed into a type depending on the turbine rotational speed without use of a centrifugal weight by utilizing the centrifugal hydraulic pressure in the hydraulic pressure chamber 83 in the clutch cylinder 81 connected to the turbine shaft 59. Therefore, even in this case, a special control means is not required. Moreover, the oil used is the oil flowing out of the torque converter and hence, an exclusive pump is also not required. Thus, it is possible to provide the lockup clutch Lc' of the simple construction at an inexpensive cost.

Although the embodiments of the present invention have been described in detail, it will be understood that the present invention is not limited to the above-described embodiments, and various modifications in design may be made without departing from the spirit and scope of the invention defined in claims.

For example, the pump extension 50b may be forced separately from the pump impeller 50 and welded to the pump impeller 50. In this case, the receiving plate 31 may be integrally formed on the pump extension 50b. In addition, needle bearings can be used as the first and second gearings 53 and 58. An orifice may be provided in the crankshaft 2 to permit the upstream and downstream supply oil passages 65a and 65b to communicate with each other, so that a portion of the oil in the upstream supply oil passage 65a is passed through the orifice directly into the downstream supply oil passage 65b.

What is claimed is:

1. A lockup clutch for a torque converter, for connecting a pump impeller and a turbine impeller of the torque converter directly to each other, said lockup clutch comprising:

a pump extension connected to the pump impeller and surrounding the turbine impeller, a receiving plate connected to said pump extension to define, within said pump extension, a hydraulic pressure chamber communicating with an oil chamber defined between the pump impeller and the turbine impeller, a pressing plate opposed to said receiving plate for movement toward and away from said receiving plate, an annular friction clutch plate which is interposed between said receiving plate and said pressing plate and connected to the turbine impeller, a return spring for biasing said pressing plate in a direction away from said receiving plate, and an escape bore extending through said receiving plate to permit an inside and outside of said receiving plate to communicate with each other on a side of an inner periphery of said friction clutch plate, wherein when a rotational speed of the pump impeller is increased to a value equal to or higher than a predetermined value, said pressing plate clamps said friction clutch plate in cooperation with said receiving plate under an action of a centrifugal hydraulic pressure which is raised within said hydraulic pressure chamber in response to the increase in the rotational speed.

2. The lockup clutch according to claim 1, further comprising a transmitting plate secured to an outer surface of the turbine impeller.

3. The lockup clutch according to claim 2, wherein an outer periphery of said friction clutch plate is spline-engaged with the transmitting plate.

4. The lockup clutch according to claim 1, wherein the escape bore extends in a direction orthogonal relative to a longitudinal axis of the torque converter.

5. The lockup clutch according to claim 1, wherein the return spring only contacts said pressing plate and said receiving plate.

* * * * *